(12) United States Patent
Wakimoto et al.

(10) Patent No.: US 10,326,169 B2
(45) Date of Patent: Jun. 18, 2019

(54) METHOD FOR MANUFACTURING PRISMATIC SECONDARY BATTERY

(71) Applicant: SANYO Electric Co., Ltd., Daito-shi, Osaka (JP)

(72) Inventors: Ryoichi Wakimoto, Hyogo (JP);
Hirofumi Furukawa, Hyogo (JP);
Kazuhiro Kitaoka, Hyogo (JP);
Yasuhiro Yamauchi, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 285 days.

(21) Appl. No.: 15/337,516

(22) Filed: Oct. 28, 2016

(65) Prior Publication Data

US 2017/0125848 A1    May 4, 2017

(30) Foreign Application Priority Data

Oct. 30, 2015   (JP) .................................. 2015-213990

(51) Int. Cl.
*H01M 10/0585* (2010.01)
*H01M 4/131* (2010.01)
(Continued)

(52) U.S. Cl.
CPC ....... *H01M 10/0585* (2013.01); *B23K 26/206* (2013.01); *H01M 2/043* (2013.01);
(Continued)

(58) Field of Classification Search
CPC ......... H01M 10/0413; H01M 10/0525; H01M 10/0585; H01M 2220/20; H01M 2/043; H01M 2/0473; H01M 2/206; H01M 2/266; H01M 2/362; H01M 2/365; H01M 4/0404; H01M 4/0471; H01M 4/131; H01M 4/133;
(Continued)

(56) References Cited

U.S. PATENT DOCUMENTS

2006/0051664 A1   3/2006  Tasai et al.
2009/0004561 A1   1/2009  Nansaka et al.
(Continued)

FOREIGN PATENT DOCUMENTS

JP   2000-223109 A   8/2000
JP   2002-231214 A   8/2002
(Continued)

*Primary Examiner* — Carlos Barcena
(74) *Attorney, Agent, or Firm* — Westerman, Hattori, Daniels & Adrian, LLP

(57) ABSTRACT

A first electrode body element and a second electrode body element including a positive electrode plate and a negative electrode plate are fabricated, a first positive electrode tab group of the first electrode body element and a second positive electrode tab group of the second electrode body element are connected to a lead portion of a positive electrode collector attached to a sealing plate, a first negative electrode tab group of the first electrode body element and a second negative electrode tab group of the second electrode body element are connected to a lead portion of a negative electrode collector attached to the sealing plate, and the first electrode body element and the second electrode body element are arranged together as one such that an electrode body is formed.

9 Claims, 10 Drawing Sheets

(51) Int. Cl.

| | | |
|---|---|---|
| *H01M 4/133* | (2010.01) | |
| *H01M 4/1393* | (2010.01) | |
| *H01M 4/1391* | (2010.01) | |
| *H01M 4/04* | (2006.01) | |
| *H01M 4/505* | (2010.01) | |
| *H01M 4/525* | (2010.01) | |
| *H01M 4/583* | (2010.01) | |
| *H01M 4/62* | (2006.01) | |
| *H01M 4/66* | (2006.01) | |
| *H01M 2/36* | (2006.01) | |
| *H01M 10/04* | (2006.01) | |
| *H01M 10/0525* | (2010.01) | |
| *B23K 26/20* | (2014.01) | |
| *H01M 2/04* | (2006.01) | |
| *H01M 2/20* | (2006.01) | |
| *H01M 2/26* | (2006.01) | |
| *B23K 101/36* | (2006.01) | |

(52) U.S. Cl.
CPC ........... *H01M 2/206* (2013.01); *H01M 2/266* (2013.01); *H01M 2/362* (2013.01); *H01M 2/365* (2013.01); *H01M 4/0404* (2013.01); *H01M 4/0471* (2013.01); *H01M 4/131* (2013.01); *H01M 4/133* (2013.01); *H01M 4/1391* (2013.01); *H01M 4/1393* (2013.01); *H01M 4/505* (2013.01); *H01M 4/525* (2013.01); *H01M 4/583* (2013.01); *H01M 4/623* (2013.01); *H01M 4/661* (2013.01); *H01M 10/0413* (2013.01); *H01M 10/0525* (2013.01); *B23K 2101/36* (2018.08); *H01M 2/0473* (2013.01); *H01M 2220/20* (2013.01)

(58) Field of Classification Search
CPC .. H01M 4/1391; H01M 4/1393; H01M 4/505; H01M 4/525; H01M 4/583; H01M 4/623; H01M 4/661

See application file for complete search history.

(56) References Cited

U.S. PATENT DOCUMENTS

| | | |
|---|---|---|
| 2009/0239133 A1 | 9/2009 | Kosugi |
| 2011/0039131 A1* | 2/2011 | Moon .................... B23K 11/11 429/7 |
| 2012/0021274 A1 | 1/2012 | Kim et al. |
| 2016/0099457 A1* | 4/2016 | Park ..................... H01M 2/266 429/94 |

FOREIGN PATENT DOCUMENTS

| | | |
|---|---|---|
| JP | 2008-226625 A | 9/2008 |
| JP | 2009-32640 A | 2/2009 |
| JP | 2009-277604 A | 11/2009 |

* cited by examiner

20

METHOD FOR MANUFACTURING PRISMATIC SECONDARY BATTERY

CROSS REFERENCE TO RELATED APPLICATIONS

The present invention application claims priority to Japanese Patent Application No. 2015-213990 filed in the Japan Patent Office on Oct. 30, 2015, the entire contents of which are incorporated herein by reference.

BACKGROUND OF THE INVENTION

Field of the Invention

The present disclosure relates to a method for manufacturing a prismatic secondary battery.

Description of Related Art

Prismatic secondary batteries such as alkaline secondary batteries and nonaqueous electrolyte secondary batteries are used m power sources for driving electric vehicles (EV), hybrid electric vehicles (HEV, PHEV), and the like.

In such prismatic secondary batteries, a battery case is formed by a bottomed tubular prismatic outer package including an opening and a seating plate that seals the opening. The battery case accommodates therein an electrode body including positive electrode plates, negative electrode plates, and separators, and an electrolyte. A positive electrode terminal and a negative electrode terminal are installed in the sealing plate. The positive electrode terminal is electrically connected to the positive electrode plates through a positive electrode collector, and the negative electrode terminal is electrically connected to the negative electrode plates through a negative electrode collector.

The positive electrode plate includes a positive electrode core body made of metal and a positive electrode active material layer formed on the surface of the positive electrode core body. A positive electrode core body exposed portion, on which no positive electrode active material layer is formed, is formed in a portion of the positive electrode core body. Furthermore, the positive electrode collector is connected to the positive electrode core body exposed portion. Furthermore, the negative electrode plate includes a negative electrode core body made of metal and a negative electrode active material layer formed on the surface of the negative electrode core body. A negative electrode core body exposed portion, on which no negative electrode active material layer is formed, is formed in a portion of the negative electrode core body. Furthermore, the negative electrode collector is connected to the negative electrode core body exposed portion.

For example, Japanese Published Unexamined Patent Application No. 2009-032640 (Patent Document 1) proposes a prismatic secondary battery using a wounded electrode body including a wounded positive electrode core body exposed portion at one end portion and a wound negative electrode core body exposed portion at the other end portion. Furthermore, Japanese Published Unexamined Patent Application No. 2008-226625 (Patent Document 2) proposes a prismatic secondary battery that uses an electrode body provided with a positive electrode core body exposed portion and a negative electrode core body exposed portion at one end portion.

BRIEF SUMMARY OF THE INVENTION

Development of on-vehicle secondary batteries, particularly, secondary batteries used in EVs and PHEVs that have a higher energy density and a larger battery capacity are awaited. In the case of the prismatic secondary battery disclosed in Patent Literature 1 described above, spaces such as left and right spaces in which the wound positive electrode core body exposed portion and the wound negative electrode core body exposed portion are disposed and an upper space between the sealing plate and the wound electrode body are required in the battery case. Such a requirement is a factor hindering the increase in energy density of the second battery.

Conversely, as is the case of the prismatic, secondary battery disclosed in Patent Literature 2, when the electrode body provided with the positive electrode core body exposed portion and the negative electrode core body exposed portion at one end portion is used, it will be easier to obtain a prismatic secondary battery with a high energy density. However, even if the electrode body provided with the positive electrode core body exposed portion and the negative electrode core body exposed portion at one end portion were to be used, with conventional manufacturing methods, in particular, with conventional methods of assembling a collector portion, it would be difficult to manufacture a prismatic secondary battery with a further increased energy density.

An object of the present disclosure is to provide a prismatic secondary battery that is high in energy density.

In an aspect of the present disclosure, a method for manufacturing a prismatic secondary battery, the prismatic, battery including an electrode body that includes a positive electrode plate and a negative electrode plate, an outer package that includes an opening and that houses the electrode body, a sealing plate that seals the opening, a positive electrode collector electrically connected to the positive electrode plate, and a negative electrode collector electrically connected to the negative electrode plate, includes attaching the positive electrode collector and the negative electrode collector to the sealing plate, electrically connecting a first positive electrode tab portion and a second positive electrode tab portion to the positive electrode collector and electrically connecting a first negative electric tab portion and a second negative electrode tab portion to the negative electrode collector after disposing, in a short direction of the sealing plate, a first electrode body element including, on a first side of the sealing plate, the positive electrode plate including the first positive electrode tab portion and the negative electrode plate including the first negative electrode tab portion, and a second electrode body element including, on a second side of the sealing plate, the positive electrode plate including the second positive electrode tab portion and the negative electrode plate including the second negative electrode tab portion, and arranging the first electrode body element and the second electrode body element together as one.

According to the method described above, since the volume of the space occupied by the collector portion including tab portions and the collectors can be extremely small, a prismatic secondary battery having a higher energy density can be obtained easily.

Note that in the connecting process, the displacement of each of the electrode body elements and the order in which the tab portions and the collectors are connected to each other are not limited to a particular displacement nor to a particular order. In the connection process, the first positive electrode tab portion and the second positive electrode tab portion may be electrically connected to the positive electrode collector, and the first negative electrode tab portion and the second negative electrode tab portion may be electrically connected to the negative electrode collector after the first electrode body element and the second electrode body element are each disposed at the corresponding one of the two ends of the sealing plate. Furthermore, in the connecting process, the first electrode body element may be disposed on one side of the sealing plate and the first positive electrode tab portion may be electrically connected to the positive electrode collector, and after the first negative electrode tab portion is electrically connected to the negative electrode collector, the second electrode body element may be disposed on the other side of the sealing plate and the second positive electrode tab portion may be electrically connected to the positive electrode collector, and the second negative electrode tab portion may be electrically connected to the negative electrode collector.

Desirably, the positive electrode collector is disposed on the sealing plate with the positive electrode insulating member in between, and the negative electrode collector is disposed on the sealing plate with the negative electrode insulating member in between.

Desirably, the first electrode body element includes a plurality of positive electrode plates and a plurality of negative electrode plates, a plurality of first positive electrode tab portions are stacked and a plurality of first negative electrode tab portions are stacked, the second electrode body element includes a plurality of positive electrode plates and a plurality of negative electrode plates, and a plurality of second positive electrode tab portions are stacked and a plurality of second negative electrode tab portions are stacked.

Desirably, in the arranging process, one side of the first electrode body element and one side of the second electrode body element are brought into contact with each other.

Desirably, in the arranging process, the first positive electrode tab portion, the second positive electrode tab portion, the first negative electrode tab portion, and the second negative electrode tab portion are bent.

Desirably, in the connecting process, an auxiliary conductive member is connected to at least one of the first positive electrode tab portion, the second positive electrode tab portion, the first negative electrode tab portion, and the second negative electrode tab portion, and at least one of the first positive electrode tab portion, the second positive electrode tab portion, the first negative electrode tab portion, and the second negative electrode tab portion is electrically connected to the positive electrode collector or the negative electrode collector with the auxiliary conductive member in between.

The present disclosure is capable of providing a prismatic secondary battery that is high in energy density.

DETAILED DESCRIPTION OF THE INVENTION

Figure 1:
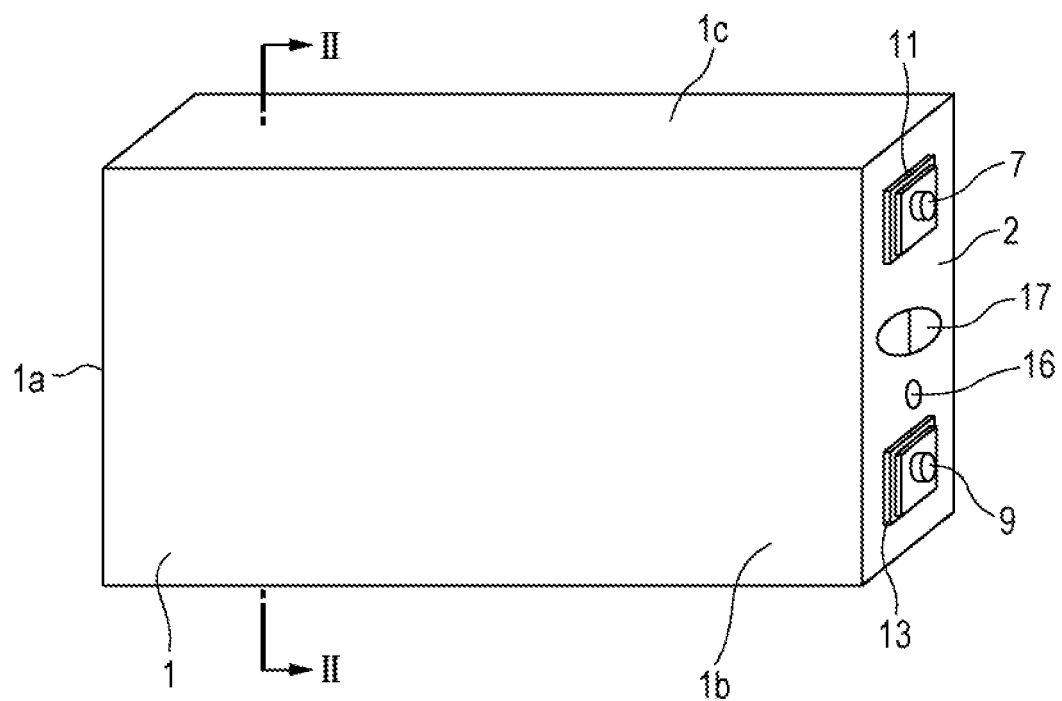
FIG. 1 is a perspective view of a prismatic secondary battery according to an exemplary embodiment.
Figure 2:
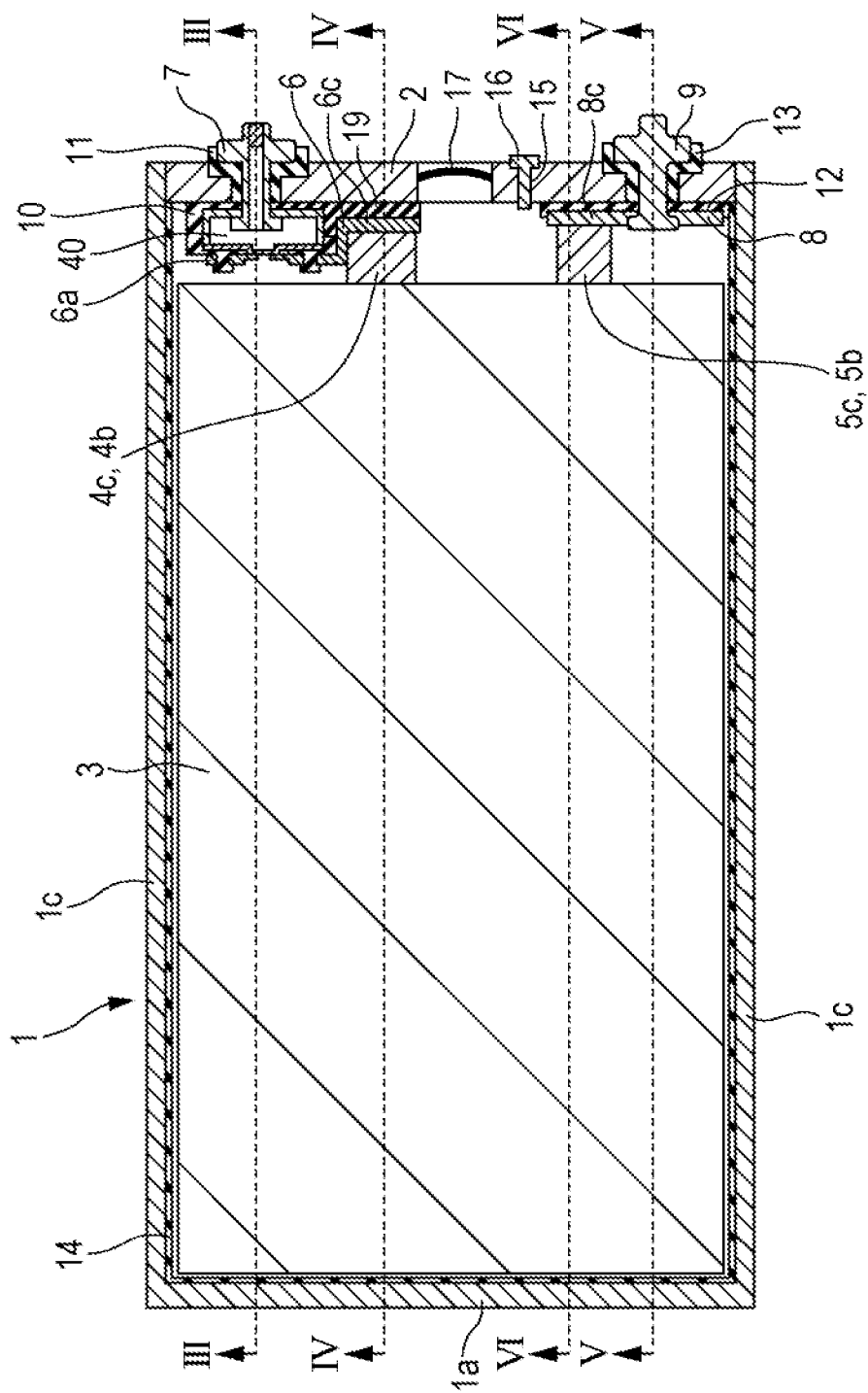
FIG. 2 is a cross-sectional view taken along line II-II in FIG. 1.
Figure 3:
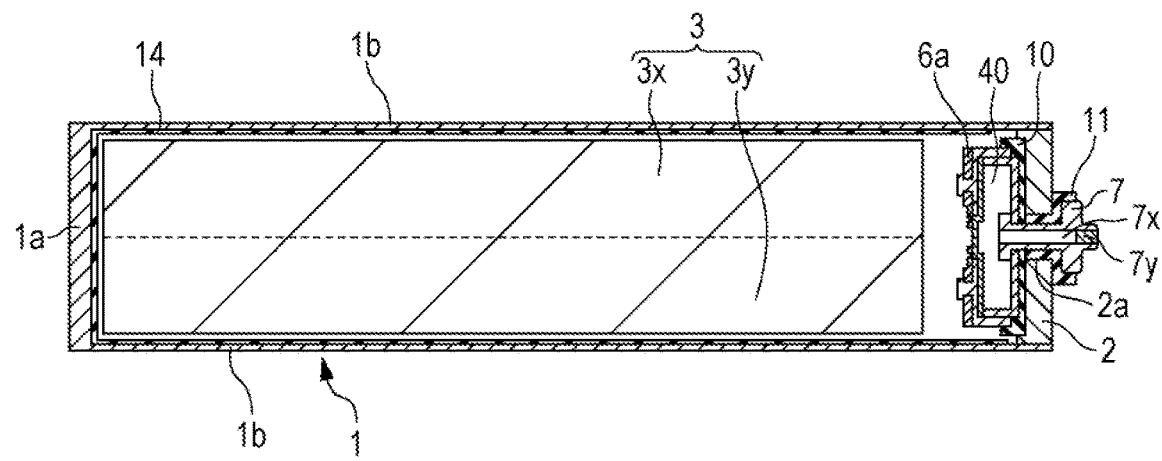
FIG. 3 is a cross-sectional view taken along line III-III in FIG. 2.
Figure 4:
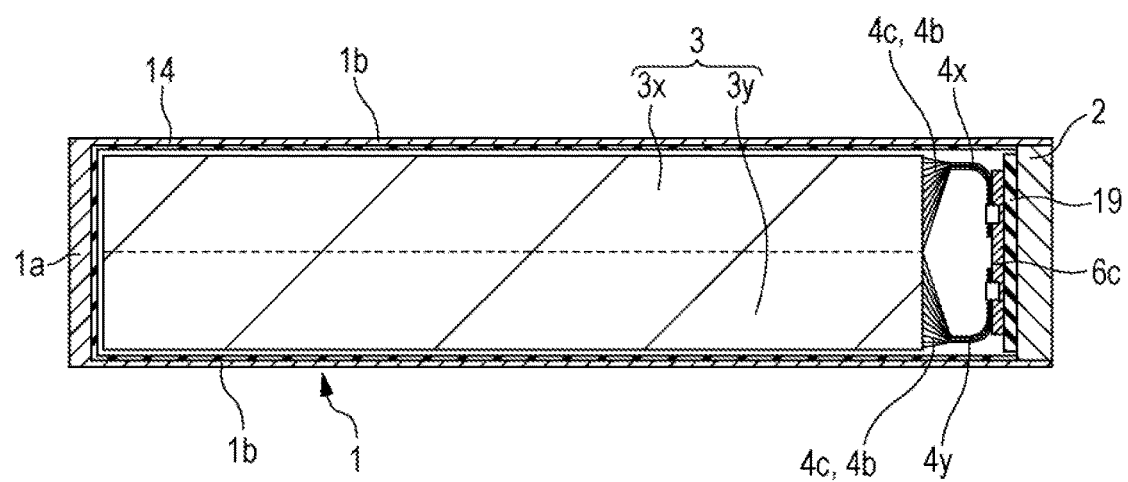
FIG. 4 is a cross-sectional view taken along line IV-IV in FIG. 2.
Figure 5:
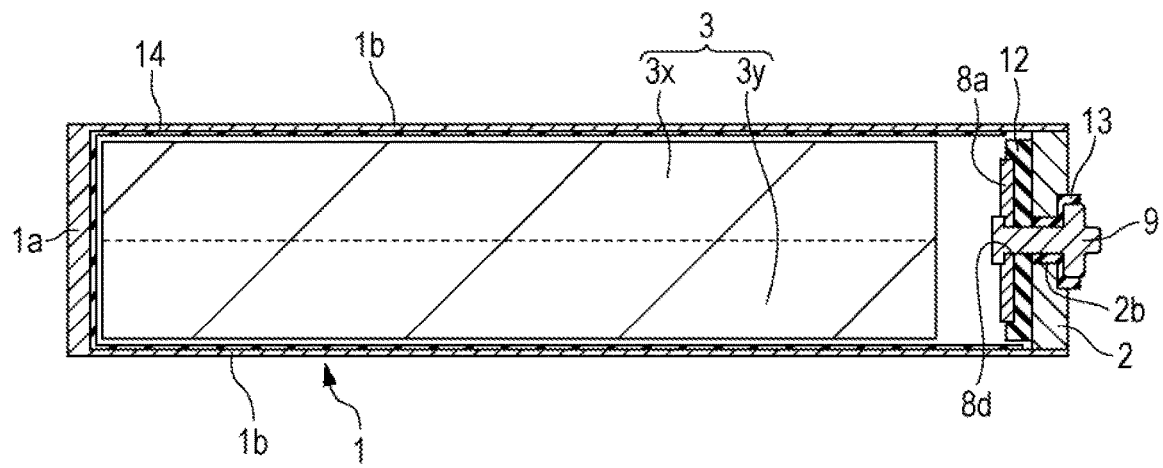
FIG. 5 is a cross-sectional view taken along line V-V in FIG. 2.
Figure 6:
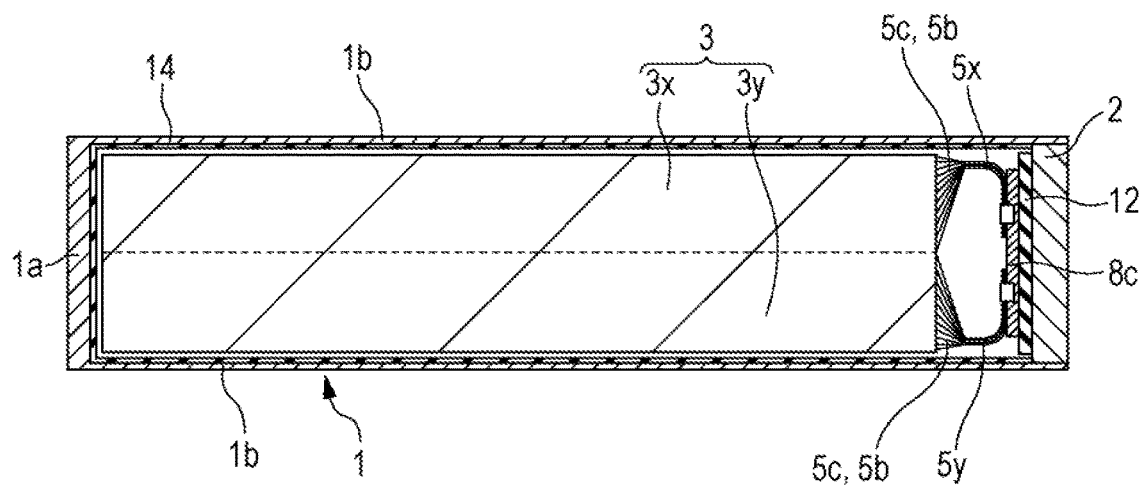
FIG. 6 is a cross-sectional view taken along line VI-VI in FIG. 2.

Hereinafter, a configuration of a prismatic secondary battery 20 according to an exemplary embodiment will be described. Note that the present disclosure is not limited to the following exemplary embodiment.

As illustrated in FIGS. 1 to 6, the prismatic secondary battery 20 includes a prismatic outer package 1 that has an opening, and a sealing plate 2 that seals the opening. The prismatic outer package 1 and the sealing plate 2 are desirably made of metal and, for example, may be made of aluminum or an aluminum alloy. The prismatic outer package 1 includes a bottom 1a, a pair of large-area side walls 1b, and a pair of small-area side walls 1c. The prismatic outer package 1 is a bottomed and tubular outer package having a rectangular shape and includes the opening at a position facing the bottom 1a. A stacked electrode body 3 in which a plurality of positive electrode plates 4 and a plurality of negative electrode plates 5 are stacked with separators interposed therebetween are accommodated in the prismatic outer package 1 together with an electrolyte.

Each positive electrode plate 4 includes a positive electrode core body made of metal and a positive electrode active material layer 4a that include a positive electrode active material formed on the positive electrode core body. Each positive electrode plate 4 includes, at one of its ends, a positive electrode core body exposed portion 4b in which the positive electrode core body is exposed. Note that, desirably, an aluminum foil or an aluminum alloy foil is used for the positive electrode core body. Each negative electrode plate 5 includes a negative electrode core body made of metal and a negative electrode active material layer 5a that include a negative electrode active material formed on the negative electrode core body. Each negative electrode plate 5 includes, at one of its ends, a negative electrode core body exposed portion 5b in which the negative electrode core body is exposed. Note that, desirably, a copper foil or a copper alloy foil is used for the negative electrode core body. In the prismatic secondary battery 20, each positive electrode core body exposed portion 4b constitutes a positive electrode tab portion 4c, and each negative electrode core body exposed portion 5b constitutes a negative electrode tab portion 5c.

At an end portion of the electrode body 3 on the sealing plate 2 side, positive electrode tab portions 4c are disposed in a stacked state to constitute positive electrode tab groups (4x and 4y) and the negative electrode tab portions 5c are disposed in a stacked state to constitute negative electrode tab groups (5x and 5y). The stacked positive electrode tab portions 4c are connected to a lead portion 6c of a positive electrode collector 6. Furthermore, a positive electrode terminal 7 is electrically connected to the positive electrode collector 6. The stacked negative electrode tab portions 5c are connected to a lead portion 8c of a negative electrode collector 8. Furthermore, a negative electrode terminal 9 is electrically connected to the negative electrode collector 8. A pressure-sensitive current breaking mechanism 40 is provided in the conductive path between the positive electrode plates 4 and the positive electrode terminal 7. The current breaking mechanism 40 is activated when the pressure inside the battery becomes equivalent to or higher than a predetermined value, and the electric current is cut off by cutting off the conductive path between the positive electrode plates 4 and the positive electrode terminal 7. Note that the pressure-sensitive current breaking mechanism 40 may be provided in the conductive path between the negative electrode plates 5 and the negative electrode terminal 9.

The positive electrode terminal 7 is attached to the sealing plate 2 in an electrically insulated state with respect to the sealing plate 2 with an inner side insulating member 10 and an outer side insulating member 11. Furthermore, the negative electrode terminal 9 is attached to the sealing plate 2 in an electrically insulated state with respect to the sealing plate 2 with an inner side insulating member 12 and an outer side insulating member 13. The inner side insulating members 10 and 12 and the outer side insulating members 11 and 13 are desirably made of resin. A terminal through-hole 7x is provided in the positive electrode terminal 7, and the terminal through-hole 7x is sealed with a terminal plug 7y.

The electrode body 3 is accommodated inside the prismatic outer package 1 while being covered by an insulation sheet 14. Desirably, the insulation sheet 14 is a resin sheet folded in a box shape or a bag-shaped resin sheet. The sealing plate 2 is joined to an opening edge portion of the prismatic outer package 1 by, for example, laser welding. The sealing plate 2 includes an electrolyte injection hole 15, and the electrolyte injection hole 15 is sealed with a sealing plug 16 after injection of the electrolyte. A gas discharge valve 17 is formed in the sealing plate 2. The gas discharge valve 17 is activated when the pressure inside the battery becomes equivalent to or higher than a predetermined value and is for discharging gas inside the battery to the outside of the battery. Note that the pressure in which the gas discharge valve 17 is activated is set higher than the pressure in which the current breaking mechanism 40 is activated.

A method for manufacturing the prismatic secondary battery 20 will be described next. Fabrication of positive electrode plate A positive electrode slurry containing lithium-nickel-cobalt-manganese composite oxide as a positive electrode active material, polyvinylidene fluoride (PVdF) as a binding agent, a carbon material as a conductive material, and N-methylpyrrolidone (NMP) is fabricated. The positive electrode slurry is coated on both surfaces of a rectangular aluminum foil that is 15 μm thick and that serves as the positive electrode core body. Subsequently, by drying the above, the N-methylpyrrolidone in the positive electrode slurry is removed and the positive electrode active material layers are formed on the positive electrode core body. Subsequently, a compression process is performed to compress the positive electrode active material layers to a predetermined thickness. The positive electrode plate obtained in the above manner is cut into a predetermined shape.

Fabrication of Negative Electrode Plate

A negative electrode slurry containing graphite as a negative electrode active material, styrene-butadiene rubber (SBR) as the binding agent, carboxymethyl cellulose (CMC) as a thickener, and water is fabricated. The negative electrode slurry is coated on both surfaces of a rectangular copper foil that is 8 μm thick and that serves as the negative electrode core body. Subsequently, by drying the above, the water in the negative electrode slurry is removed and the negative electrode active material layers are formed on the negative electrode core body. Subsequently, as compression process is performed to compress the negative electrode active material layers to a predetermined thickness. The negative electrode plate obtained in the above manner is cut into a predetermined shape.

Figure 7A:
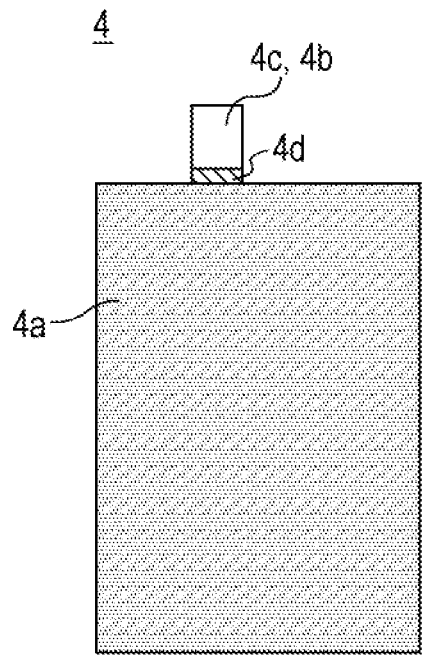
FIGS. 7A and 7B are plan views of a positive electrode plate and a negative electrode plate according to the exemplary embodiment.
Figure 7B:
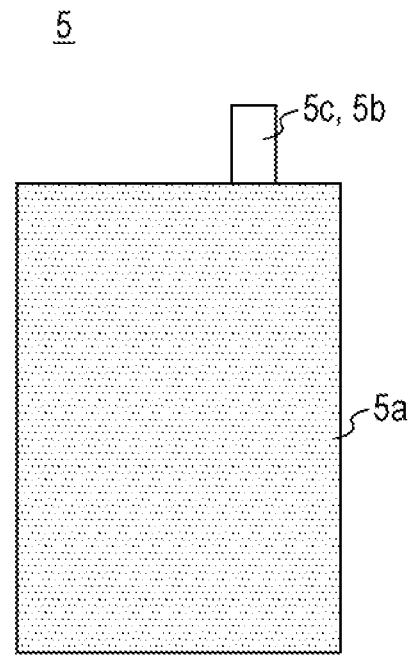

FIG. 7A is a plan view of a positive electrode plate 4 after cutting, and FIG. 7B is a plan view of a negative electrode plate 5 after cutting. The positive electrode plate 4 includes rectangular areas that are positive electrode active material layers 4a formed on both surfaces of the positive electrode core body, and the positive electrode core body exposed portion 4b serving as the positive electrode tab portion 4c is formed on one side of the positive electrode plate 4. The negative electrode plate 5 includes rectangular areas that are negative electrode active material layers 5a formed on both surfaces of the negative electrode core body, and the negative electrode core body exposed portion 5b serving as the negative electrode tab portion 5c is formed on one side of the negative electrode plate 5. Note that the size of the positive electrode plate 4 is slightly smaller than the size of the negative electrode plate 5. Desirably, an insulating layer or a protective layer 4d that has an electric resistance that is higher than that of the positive electrode core body is provided at the base portion of the positive electrode tab portion 4c. Note that conductive members other than the above may be connected to the positive electrode core body exposed portion 4b or the negative electrode core body exposed portion 5b to serve as the positive electrode tab portion 4c or the negative electrode tab portion 5c, respectively.

Fabrication of Electrode Body Elements

Figure 8:
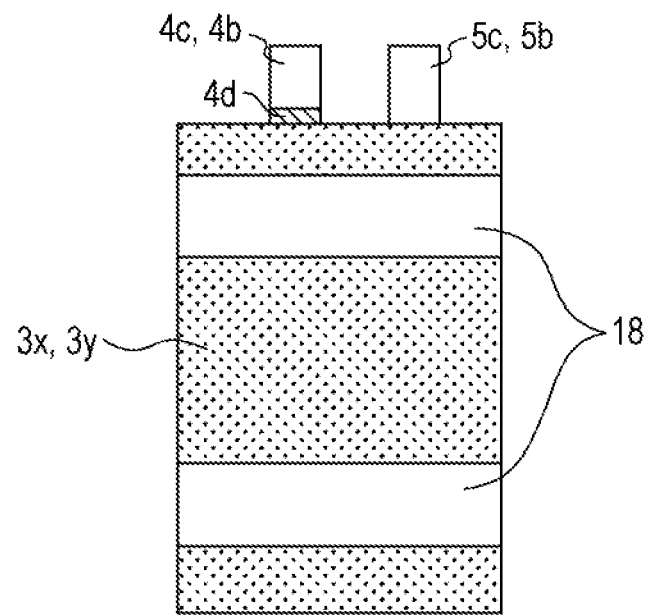
FIG. 8 is a plan view of an electrode body element according to the exemplary embodiment.

Stacked electrode body elements (3x and 3y) are fabricated by fabricating 50 pieces of positive electrode plates 4 and 51 pieces of negative electrode plates 5 with the above methods and by stacking each positive electrode plate 4 and each negative electrode plate 5 on each other with a rectangular polyolefin separator therebetween. As illustrated in FIG. 8, the stacked electrode body elements (3x and 3y) are fabricated such that the positive electrode tab portions 4c of the positive electrode plates 4 and the negative electrode tab portions 5c, of the negative electrode plates 5 are stacked at one end portion of the electrode body 3. Separators may be disposed on both outer surfaces of the electrode body elements (3x and 3y) and the electrode plates and the separators may be fixed with tapes 18 and the like in a stacked state. Alternatively, an adhesion layer may be provided on each separator such that the separators and the positive electrode plates 4, and the separators and the negative electrode plates 5 are adhered to each other. Note that the size of the separator in plan view is the same or larger than the size of the negative electrode plate 5. Each positive electrode plate 4 may be disposed between two separators and after heat welding the outer peripherals of the separators, each of the positive electrode plates 4 and each of the negative electrode plates 5 may be stacked on each other.

Figure 9:
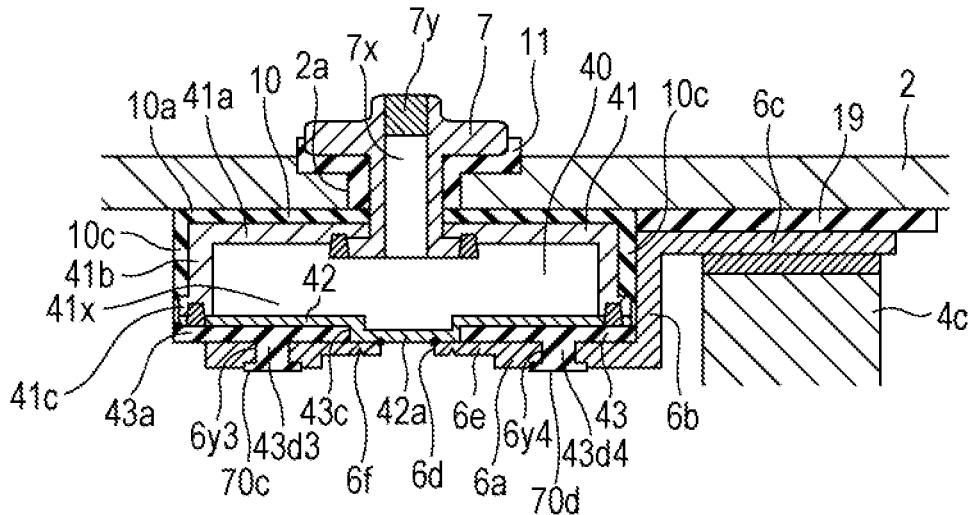
FIG. 9 is a cross-sectional view of a portion in the vicinity of a current breaking mechanism in a longitudinal direction of a sealing plate.
Figure 10:
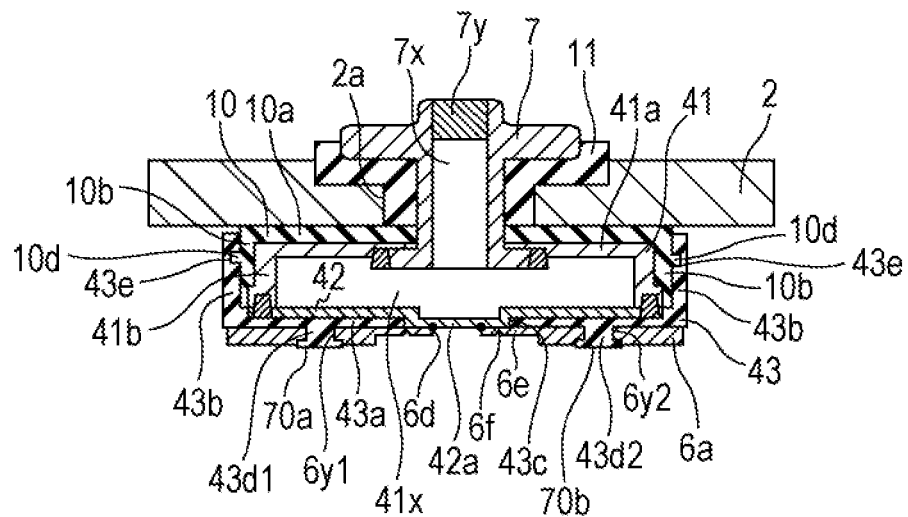
FIG. 10 is a cross-sectional view of a portion in the vicinity of the current breaking mechanism in a short direction of the sealing plate.

Attaching Positive Electrode Terminal and Current Breaking Mechanism to Sealing Plate FIG. 9 is a cross-sectional view of a portion in the vicinity of the current breaking mechanism 40 in a longitudinal direction of the sealing plate 2. FIG. 10 is a cross-sectional view of a portion in the vicinity of the current breaking mechanism 40 in a short direction of the sealing plate 2.

A positive electrode terminal mounting hole 2a serving as a through-hole is formed in the sealing plate 2. The outer side insulating member 11 is disposed on the battery outer surface side of the positive electrode terminal mounting hole 2a, and the inner side insulating member 10 and a conductive member 41 are disposed on the battery inner surface side. Furthermore, the positive electrode terminal 7 is inserted from the outer side of the battery through the through-holes formed in the outer side insulating member 11, the sealing plate 2, the inner side insulating member 10, and the conductive member 41, and the tip of the positive electrode terminal 7 is riveted on the conductive member 41. Note that the riveted portion of the tip of the positive electrode terminal 7 is, desirably, further welded to the conductive member 41.

Desirably, the conductive member 41 has a cup-shape that includes an opening portion 41x open towards the electrode body 3 side. The conductive member 41 includes a base portion 41a that is disposed parallel to the sealing plate 2, and a cylindrical portion 41b that extends from the base portion 41a towards the electrode body 3 side. The cylindrical portion 41b may have a cylindrical shape or may be a rectangular tubular portion. The conductive member 41 is made of metal and, desirably, is made of aluminum or an aluminum, alloy. The positive electrode terminal 7 is connected to the base portion 41a. Note that the positive electrode terminal 7 and the conductive member 41 may be an integral component. In such a case, the positive electrode terminal 7 is inserted into the through-holes of the components from the inner side of the battery and is riveted on the outer side of the battery.

The timer side insulating member 10 includes an insulating member body portion 10a disposed between the sealing plate 2 and the base portion 41a of the conductive member 41, a pair of insulating member first side walls 10b that extend from the two end portions of the insulating member body portion 10a in the short direction of the sealing plate 2 towards the electrode body 3 side, and a pair of insulating member second side walls 10c that extend from the two end portions of the insulating member body portion 10a in the longitudinal direction of the sealing plate 2 towards the electrode body 3 side. A protrusion 10d is formed an the outer surface of each insulating member first side wall 10b.

Subsequently, a deformation plate 42 is disposed so as to close the opening portion 41x of the conductive member 41 on the electrode body 3 side, and the outer peripheral edge of the deformation plate 42 is joined to the conductive member 41 by laser welding or the like. With the above, the opening portion 41x of the conductive member 41 on the electrode body 3 side is sealed in an airtight manner. The deformation plate 42 is made of metal and, desirably, is made of aluminum or an aluminum alloy. The shape of the deformation plate 42 is desirably the same as that of the opening portion 41x of the conductive member 41. In the prismatic secondary battery 20, the deformation plate 42 has a circular shape in plan view.

Subsequently, a dielectric plate 43 is disposed on the surface of the deformation plate 42 on the electrode body 3 side. The dielectric plate 43 includes a dielectric plate body portion 43a disposed between the deformation plate 42 and a collector body portion 6a of the positive electrode collector 6, and a pair of dielectric plate first side walls 43b that extend from two edge portions of the dielectric plate body portion 43a in a short direction of the sealing plate 2 towards the sealing plate 2 side. A dielectric plate through-hole 43c, a first projection 43d1, a second projection 43d2, a third projection 43d3, and a fourth projection 43d4 are formed in the dielectric plate body portion 43a. Furthermore, recesses 43e are formed on the inner surface of the dielectric plate first side walls 43b.

A projection 42a formed in the middle portion of the deformation plate 42 is inserted into the dielectric plate through-hole 43c formed in the dielectric plate body portion 43a. Furthermore, the inner surfaces of the dielectric plate first side walls 43b are disposed so as to face the outer surfaces of the insulating member first side walls 10b. Furthermore, by fitting the protrusions 10d and the recesses 43e to each other, the insulating member 10 and the dielectric plate 43 are connected to each other. Note that the recesses 43e may be through-holes.

Flange portions 41c are provided on the end portions of the conductive member 41 on the electrode body 3 side. Furthermore, hooking and fixing portions that can be hooked to the flange portions 41c of the conductive member 41 are desirably provided on the surface of the dielectric plate body portion 43a on the sealing plate 2 side. With the above, the dielectric plate 43 is fixed to the conductive member 41.

Positive Electrode Collector

Figure 11:
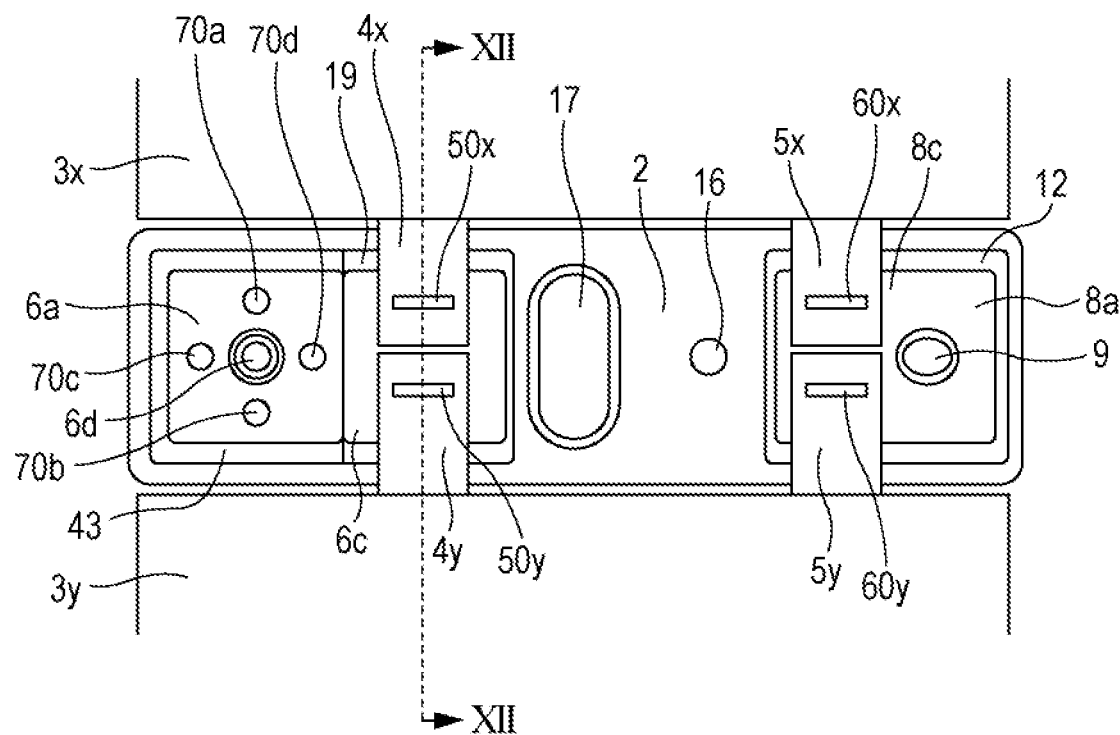
FIG. 11 is a diagram of a battery internal surface side of a sealing plate to which the collectors have been attached.

As illustrated in FIGS. 9 to 11, the positive electrode collector 6 includes the collector body portion 6a, the lead portion 6c collector, and as collector connection 6b that connects the collector body portion 6a and the lead portion 6c To each other.

A through-hole 6d for connection is formed in the collector body portion 6a, and a thin wall portion 6e is formed around the through-hole 6d for connection. Furthermore, an annular groove portion 6f is provided inside the thin wall portion 6e so as to surround the through-hole 6d for connection. The thickness (the residual thickness) of the groove portion 6f is smaller than that of the thin wall portion 6e. Note that the annual groove portion 6f is a fragile portion and is broken upon deformation of the deformation plate 42. In other words, the fragile portion is the portion to be broken. Note that since it is only sufficient that the conductive path is cut off upon breakage of the fragile portion, both of the thin wall portion 6e and the groove portion 6f do not have to be provided. Only the thin wall portion 6e or only the groove portion 6f may be provided. Alternatively, the connection between the deformation plate 42 and the collector body portion 6a may be a fragile portion without providing the thin wall portion 6e of the groove portion 6f. Alternatively, the fragile portion, such as the thin wall portion or a groove portion, may be provided in the deformation plate 42. Note that the through-hole 6d for connection is not an essential configuration, and the thin wall portion provided in the collector body portion 6a may be connected to the deformation plate 42.

A first through-hole 6y1 for fixing, a second through-hole 6y2 for fixing, a third through-bole 6y3 for fixing, and a fourth through-hole 6y4 for fixing are provided in the collector body portion 6a. A recess is provided around each of the first through-hole 6*y*1 for fixing, the second through-hole 6*y*2 for fixing, the third through-hole 6*y*3 for fixing, and the fourth through-hole 6*y*4 for fixing.

Attaching Positive Electrode Collector

The positive electrode collector 6 described above is disposed on the surface of the dielectric plate 43 on the electrode body 3 side. In so doing, the first projection 43*d*1, the second projection 43*d*2, the third projection 43*d*3, and the fourth projection 43*d*4 formed in the dielectric plate 43 are respectively inserted into the first through-hole 6*y*1 for fixing, the second through-hole 6*y*2 for fixing, the third through-hole 6*y*3 for fixing, and the fourth through-hole 6*y*4 for fixing formed in the positive electrode collector 6. Subsequently, by expanding the diameters of the tips of the first projection 43*d*1, the second projection 43*d*2, the third projection 43*d*3, and the fourth projection 43*d*4, the positive electrode collector 6 is fixed to the dielectric plate 43. With the above, a first fixed portion 70*a*, a second fixed portion 70*b*, a third fixed portion 70*c*, and a fourth fixed portion 70*d* are formed. Note that the projections may be press-fitted into the through-holes for fixing.

Gas is sent in through the terminal through-hole 7*x* formed in the positive electrode terminal 7 from the outer side of the battery, such that the deformation plate 42 is urged against the collector body portion 6*a* of the positive electrode collector 6. In the above state, the edge portion of the through-hole 6*d* for connection provided in the collector body portion 6*a* of the positive electrode collector 6 and the deformation plate 42 are joined together by laser welding or the like. Note that the through-hole 6*d* for connection is not an essential configuration and a collector body portion 6*a* that has no through-hole 6*d* for connection may be joined to the deformation plate 42. The terminal through-hole 7*x* is sealed with the terminal plug 7*y*.

As illustrated in FIGS. 9 to 11, the collector body portion 6*a* of the positive electrode collector 6 is disposed on the surface of the dielectric plate 43 on the inner side of the battery. The collector connection 6*b* that extend towards the sealing plate 2 the collector body portion 6*a* is provided at an end portion of the collector body portion 6*a*. Furthermore, the lead portion 6*c* is provided so as to extend along the sealing plate 2 from an end portion of the collector connection 6*b* on the sealing plate 2 side towards the gas discharge valve 17. The lead portion 6*c* is disposed parallel to the sealing plate 2. The lead portion 6*c* is disposed on the sealing plate 2 with a lead portion insulating member 19 (a positive electrode insulating member) in between. Note that the lead portion insulating member 19 may be formed with the inner side insulating member 10 or the dielectric plate 43 in an integrated manner.

Attaching Negative Electrode Terminal to Sealing Plate

A negative electrode terminal mounting hole 2*b* serving as a through-hole is formed in the sealing plate 2. The outer side insulating member 13 is disposed on the outer surface side of the negative electrode terminal mounting hole 2*b*, and the inner side insulating member 12 and a collector body portion 8*a* of the negative electrode collector 8 are disposed on the inner surface side. A through-hole 8*d* is provided in the collector body portion 8*a*. Furthermore, the negative electrode terminal 9 is inserted from the outer side of the battery through the through-holes formed in the outer side insulating member 13, the sealing plate 2, the inner side insulating member 12, and collector body portion 8*a* of the negative electrode collector 8, and the tip of the negative electrode terminal 9 is riveted on the negative electrode collector 8. Furthermore, the riveted portion of the negative electrode terminal 9 is welded to the negative electrode collector 8. The inner side insulating member 12 serves as a negative electrode insulating member. Note that when the current breaking mechanism 40 is not provided on the positive electrode side, the positive electrode collector 6 and the positive electrode terminal 7 may be attached to the sealing plate 2 through a configuration similar to that on the negative electrode side.

Connecting Tab Portions and Collectors to Each Other

Figure 12:
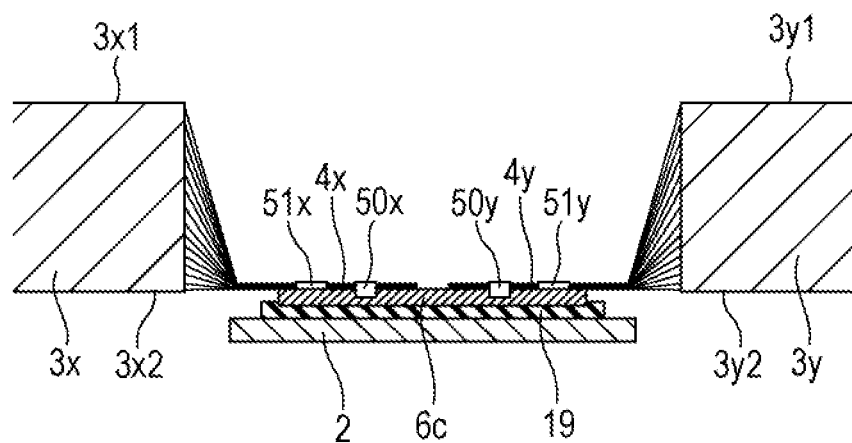
FIG. 12 is a cross-sectional view taken along line XII-XII in FIG. 11.

As illustrated in FIGS. 11 and 12, the first electrode body element 3*x* is disposed on one side of the sealing plate 2 in the short direction (the up-down direction in FIG. 11 and the left-right direction in FIG. 12) and the second electrode body element 3*y* is disposed on the other side. Subsequently, the first positive electrode tab group 4*x* of the first electrode body element 3*x* is disposed on the lead portion 6*c* of the positive electrode collector 6, and the first negative electrode tab group 5*x* of the first electrode body element 3*x* is disposed on the lead portion 8*c* of the negative electrode collector 8. Furthermore, the second positive electrode tab group 4*y* of the second electrode body element 3*y* is disposed on the lead portion 6*c* of the positive electrode collector 6, and the second negative electrode tab group 5*y* of the second electrode body element 3*y* is disposed on the lead portion 8*c* of the negative electrode collector 8. In so doing, in the first electrode body element 3*x*, the positive electrode tab portions 4*c* constituting the first positive electrode tab group 4*x* are bundled on an undersurface 3*x*2 side of the first electrode body element 3*x*. Furthermore, the negative electrode tab portions 5*c* constituting the first negative electrode tab group 5*x* are bundled on an undersurface 3*x*2 side of the first electrode body element 3*x*. In a similar manner, in the second electrode body element 3*y*, the positive electrode tab portions 4*c* that constitute the second positive electrode group 4*y* are bundled on an undersurface 3*y*2 side of the second electrode body element, 3*y* and the negative electrode tab portions 5*c* that constitute the second negative electrode tab groups 5*y* are bundled on the undersurface 3*y*2 side of the second electrode body element 3*y*.

Subsequently, a high energy ray such as a laser beam is projected from above to the first positive electrode tab group 4*x* and the second positive electrode tab group 4*y* disposed on the lead portion 6*c* of the positive electrode collector 6 to weld the first positive electrode tab group 4*x* and the second positive electrode tab group 4*y* to the lead portion 6*c*. Furthermore, a high energy ray such as a laser beam is projected from above to the first negative electrode tab group 5*x* and the second negative electrode tab group 5*y* disposed on the lead portion 8*c* of the negative electrode collector 8 to weld the first negative electrode tab group 5*x* and the second negative electrode tab group 5*y* to the lead portion 8*c*. With the above, welded portions 50*x*, 50*y*, 60*x*, and 60*v* are formed.

Note that in each of the first electrode body element 3*x* and the second electrode body element 3*y*, it is desirable that the positive electrode tab portions 4*c* are joined to each other by welding or the like and preliminary joint portions 51*x* and 51*y* are formed in advance before connecting the tab portions and the collectors to each other. Furthermore, in a similar manner, preliminary joint portions are formed in advance on the negative electrode side as well by joining the negative electrode tab portions 5*c* to each other. Note that it is desirable that the preliminary joint portions 51*x* and 51*y* be provided at positions opposing the lead portion 6*c* of the positive electrode collector 6. By so doing, in a case in which the positive electrode tab portions 4*c* are bent so as to arrange the positive electrode tab portions 4*c* together, the preliminary joint portions can prevent the bending process from becoming hampered. In the positive electrode tab portions 4c after the bending process, the preliminary joint portions 51x and 51y are, desirably, provided in areas that enables the preliminary joint portions 51x and 51y to be disposed parallel to the lead portion 6c.

Fabrication of Electrode Body

The first positive electrode tab group 4x, the second positive electrode tab group 4y, the first negative electrode tab group 5x, and the second negative electrode tab group 5y are bent such that the upper surface 3x1 of the first electrode body element 3x and the upper surface 3y1 of the second electrode body element 3y illustrated in FIG. 12 comes into contact with each other. With the above, the first electrode body element 3x and the second electrode body element 3y are formed into a single electrode body 3 illustrated in FIGS. 3 to 6.

Assembling Prismatic Secondary Battery

The electrode body 3 that is attached to the sealing plate 2 is covered with the insulation sheet 14 and is inserted into the prismatic outer package 1. Subsequently, the sealing plate 2 and the prismatic outer package 1 is joined together by laser welding or the like and the opening of the prismatic outer package 1 is sealed. After the above, nonaqueous electrolyte containing an electrolyte solvent and electrolyte salt is injected through the electrolyte injection hole 15 provided in the sealing plate 2. Subsequently, the electrolyte injection hole 15 is sealed with the sealing plug 16.

Method for Manufacturing Prismatic Secondary Battery

With the method described above, the space occupied by the collector portion can be made small easily without the structure of the collector portion, formed by the connection between the positive electrode tab portions 4c and the positive electrode collector 6 and the connection between the negative electrode tab portions 5c and the negative electrode collector 8, becoming complex. Accordingly, a prismatic secondary battery with high energy density can be manufactured with a simpler method.

Furthermore, since the positive electrode collector 6 or the negative electrode collector 8 do not have to be bent after the positive electrode tab portions 4c are connected to the positive electrode collector 6 or after the negative electrode tab portions 5c are connected to the negative electrode collector 8, the connection between the positive electrode tab portion 4c and the positive electrode collector 6 or the connection between the negative electrode tab portion 5c and the negative electrode collector 8 can be prevented from becoming damaged.

Description of modifications will be given below. Note that in the modifications, components that are the same as those of the prismatic secondary battery 20 described above are denoted with the same reference numerals as those of the prismatic secondary battery 20. Furthermore, portions that are not described in particular may each have the same configuration as that of the prismatic secondary battery 20 described above.

First Modification

Figure 13A:
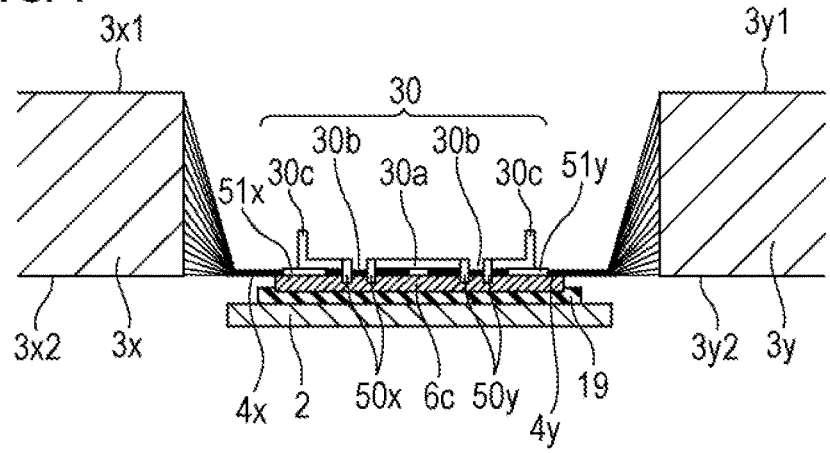
FIGS. 13A to 13C are diagrams of prismatic secondary batteries according to modifications, corresponding to FIG. 12.

FIG. 13A is a diagram of a prismatic secondary battery according to a first modification, corresponding to FIG. 12. As illustrated in FIG. 13A, the first positive electrode tab group 4x and the second positive electrode tab group 4y can be connected to the lead portion 6c of the positive electrode collector 6 while in a state in which a metal auxiliary member 30 is disposed on the first positive electrode tab group 4x and the second positive electrode tab group 4y.

Figure 14:
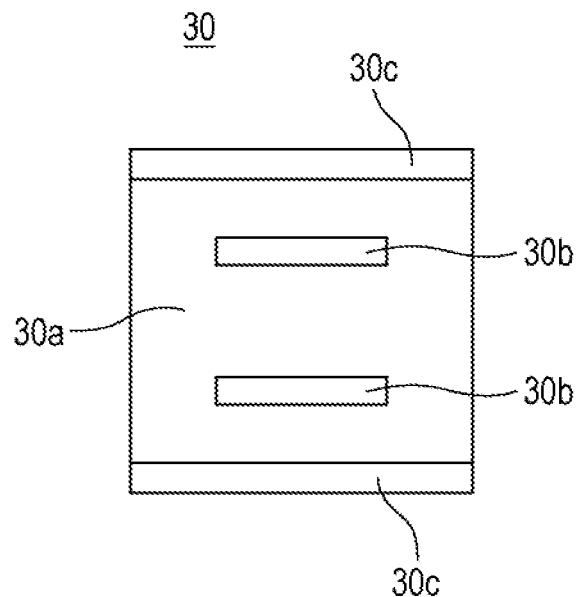
FIG. 14 is a plan view of an auxiliary member.

FIG. 14 is a plan view of the auxiliary member 30. Two slit portions 30b are formed in a body portion 30a of the auxiliary member 30. The slit portions 30b are disposed so as to extend in the longitudinal direction of the sealing plate 2. Bend portions 30c are formed at two ends (the two ends in the short direction of the sealing plate 2) of the body portion 30a. The bend portions 30c are bent from the body portion 30a so as to stand erect from the body portion 30a.

Regarding the connecting procedure, first, the auxiliary member 30 and the lead portion 6c of the positive electrode collector 6 hold the first positive electrode tab group 4x and the second positive electrode tab group 4y in between. Subsequently, by projecting a high energy ray such as a laser beam to the edge portions of the slits 30b provided in the auxiliary member 30, the auxiliary member 30, the first positive electrode tab group 4x or the second positive electrode tab group 4y, and the lead portion 6c of the positive electrode collector 6 are welded to each other. By providing bend portions 30c in the auxiliary member 30, metal spatter occurring during welding can be prevented from scattering to the electrode body elements (3x and 3y) side and damaging the electrode body elements (3x and 3y).

As illustrated in FIG. 13A, by forming two rows of separate welded portions 50x in the short direction of the sealing plate 2, the first positive electrode tab groups 4x can be connected to the lead portion 6c of the positive electrode collector 6 in a further firm manner. Same applies to the welded portions 50y.

Note that an auxiliary member may be used on the negative electrode side as well in a similar manner to that on the positive electrode side. Desirably, the auxiliary member on the positive electrode side is made of aluminum or an aluminum alloy. The auxiliary member on the negative electrode side is desirably made of copper or a copper alloy.

Second Modification

Figure 13B:
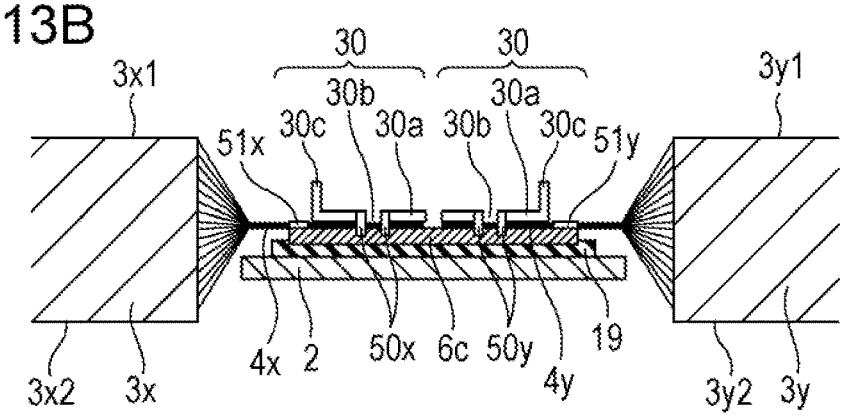

FIG. 13B is a diagram of a prismatic secondary battery according to a second modification, corresponding to FIG. 12. The difference between the first modification and the second modification is the form of the auxiliary member 30 and the way in which the positive electrode tab portions 4c and the negative electrode tab portions 5c are bundled. As in the second modification, the auxiliary member 30 may be divided into two. In other words, one of the auxiliary member 30 is connected to the first positive electrode tab group 4x and the other auxiliary member 30 is connected to the second positive electrode tab group 4y. Furthermore, as in the second modification, the positive electrode tab portions 4c can be bundled at the middle portion of each of the first electrode body element 3x and the second electrode body element 3y in the stacking direction of the electrode plates.

Third Modification

Figure 13C:
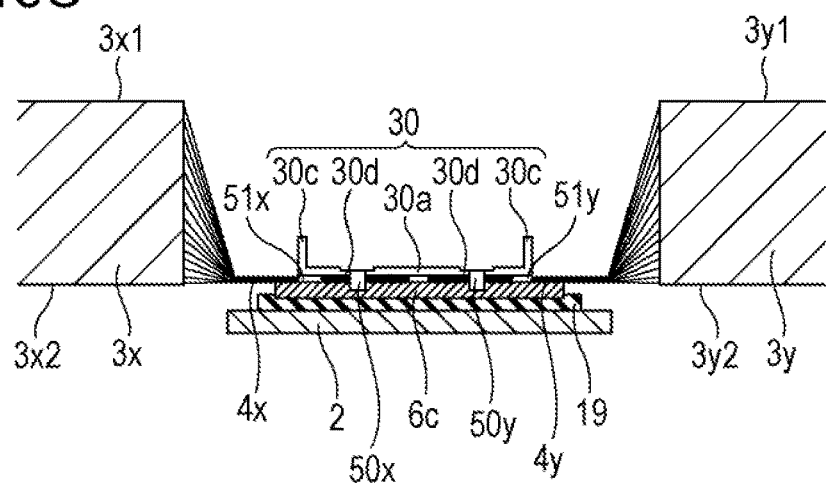

FIG. 13C is a diagram of a prismatic secondary battery according to a third modification, corresponding to FIG. 12. The difference between the first modification and the third modification is the form of the auxiliary member 30. As illustrated in the third modification, instead of providing slits 30b in the auxiliary member 30, thin wall portions 30d may be provided. Furthermore, a high energy ray such as a laser beam may be projected to the thin wall portions 30d such that the auxiliary member 30, the first positive electrode tab group 4x or the second positive electrode tab group 4y, and the lead portion 6c of the positive electrode collector 6 are welded to each other.

Fourth Modification

Figure 15:
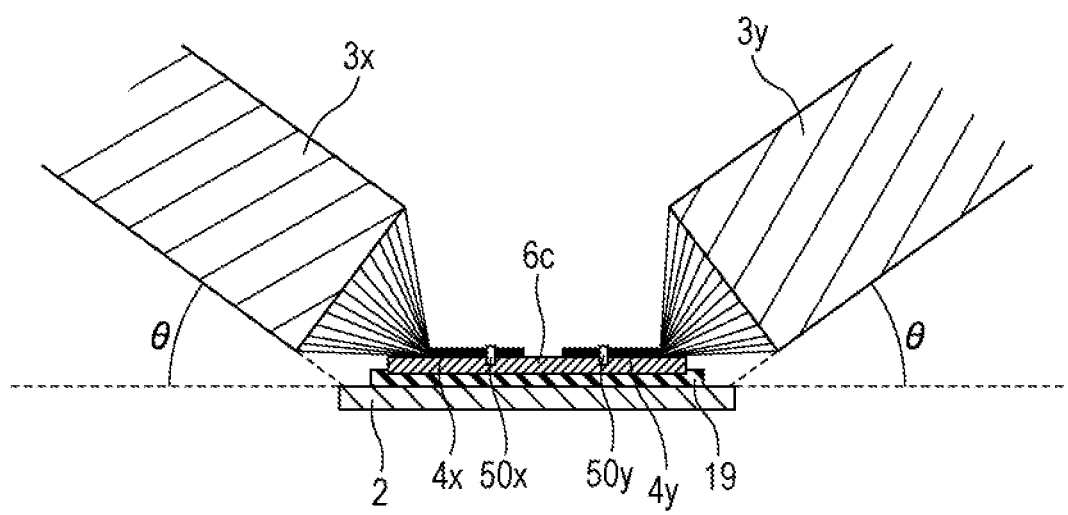
FIG. 15 is a diagram of a prismatic secondary battery according to a modification, corresponding to FIG. 12.

FIG. 15 is a diagram of a prismatic secondary battery according to a fourth modification, corresponding to FIG. 12. As illustrated in FIG. 15, the first positive electrode tab group 4x, the second positive electrode tab group 4y, the first negative electrode tab group 5x, and the second negative electrode tab group 5y can each be connected to the corresponding one of the positive electrode collector 6 and the negative electrode collector 8 while the electrode body elements (3x and 3y) are inclined with respect to the sealing plate 2. With such a method, the load applied to the positive electrode tab portions 4c, the negative electrode tab portions 5c, the joint portion between the positive electrode tab portions 4c and the positive electrode collector 6, and the connection between the negative electrode tab portions 5c and the negative electrode collector 8 can be reduced when the positive electrode tab portions 4c and the negative electrode tab portions 5c are bent to arrange the first electrode body element 3x and the second electrode body element 3y together into one. Accordingly, a prismatic secondary battery that has a higher reliability can be obtained. Note that an angle θ formed between the electrode body elements (3x and 3y) and the sealing plate 2 is preferably 5° to 70° and, more preferably, is 5° to 60°.

Fifth Modification

In the first to third modifications, examples in which the auxiliary member 30 and the positive electrode tab groups (4x, 4y) are welded to the lead portion 6c of the positive electrode collector 6 at the same time has been given. However, an auxiliary conductive member may be connected to the positive electrode tab groups (4x and 4y) or the negative electrode tab groups (5x and 5y) in advance. Furthermore, the auxiliary conductive member joined to the positive electrode tab groups (4x and 4y) or the negative electrode tab groups (5x and 5y) may be connected to a collector.

Figure 16A:
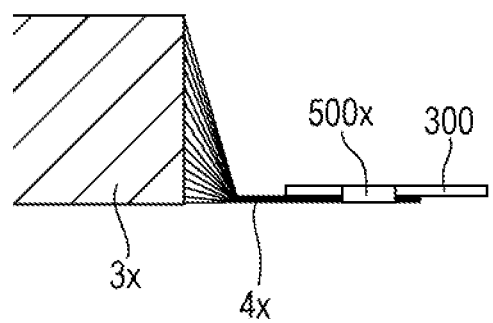
FIGS. 16A and 16B are cross-sectional views of electrode body elements used in the prismatic secondary batteries according to the modifications.
Figure 16B:
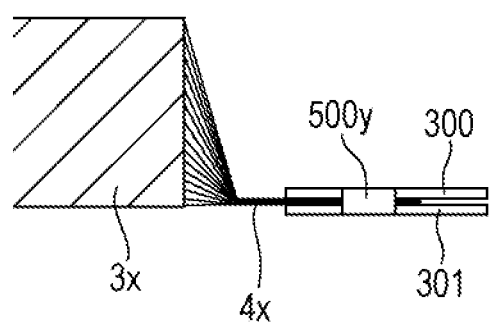

FIGS. 16A and 16B are figures related to a prismatic secondary battery according to a fifth modification in which the auxiliary conductive member is connected to the first positive electrode tab group 4x of the first electrode body element 3x. As illustrated in FIG. 16A, an auxiliary conductive member 300 may be connected to the first positive electrode tab group 4x of the first electrode body element 3x by welding. Note that a welded portion 500x is formed by the welding. Furthermore, subsequently, the auxiliary conductive member 300 is connected to the lead portion 6c of the positive electrode collector 6. Regarding the method of connecting the auxiliary conductive member 300 to the lead portion 6c of the positive electrode collector 6, two end portions of the auxiliary conductive member 300 may be laser welded to the lead portion be of the positive electrode collector 6.

Furthermore, as illustrated in FIG. 16B, while two auxiliary conductive members 300 and 301 hold the first positive electrode tab group 4x of the first electrode body element 3x in between, the auxiliary conductive members 300 and 301 can be connected to the first positive electrode tab group 4x in advance. Note that a welded portion 500y is formed in the first positive electrode tab group 4x, the auxiliary conductive member 300, and the auxiliary conductive member 301. Furthermore, subsequently, at least one of the auxiliary conductive members 300 and 301 is connected to the lead portion 6c of the positive electrode collector 6. Note that the method for connecting the first positive electrode tab group 4x and the auxiliary conductive members 300 and 301, and the method for connecting at least one of the auxiliary conductive members 300 and 301 to the lead portion 6c of the positive electrode collector 6 are not limited to any method in particular and resistance welding, ultrasonic welding, laser welding, or the like may be used. Furthermore, the first positive electrode tab group 4x and the auxiliary conductive members 300 and 301 may be connected to each other in advance by riveting or the like and, after that, at least one of the auxiliary conductive members 300 and 301 may be welded and joined to the lead portion 6c of the positive electrode collector 6.

Others

It is only sufficient that the present invention is applied to either one of the positive electrode side or the negative electrode side.

The method of connecting the positive electrode tab portions and the positive electrode collector to each other and the method of connecting the negative electrode tab portions and the negative electrode collector to each other are not limited to any method in particular and, for example, resistance welding, welding through projection of, for example, a high energy ray such as laser ultrasonic welding, or ultrasonic welding may be used. The high energy ray used may include a laser beam, an electron beam, and an ion beam.

The electrode body element is not limited to a stacked type. A belt-shaped positive electrode plate and a belt-shaped negative electrode plate with a belt-shaped separator in between may be wound as the electrode body element.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method for manufacturing a prismatic secondary battery including an electrode body that includes a positive electrode plate and a negative electrode plate, an outer package that includes an opening and that houses the electrode body, a sealing plate that seals the opening, a positive electrode collector electrically connected to the positive electrode plate, and a negative electrode collector electrically connected to the negative electrode plate, the method comprising:
attaching the positive electrode collector and the negative electrode collector to the sealing plate;
electrically connecting a first positive electrode tab portion and a second positive electrode tab portion to the positive electrode collector and electrically connecting a first negative electric tab portion and a second negative electrode tab portion to the negative electrode collector after disposing, in a short direction of the sealing plate,
a first electrode body element including, on a first side of the sealing plate, the positive electrode plate including the first positive electrode tab portion and the negative electrode plate including the first negative electrode tab portion, and a second electrode body element including, on a second side of the sealing plate, the positive electrode plate including the second positive electrode tab portion and the negative electrode plate including the second negative electrode tab portion; and arranging the first electrode body element and the second electrode body element together as one; and wherein in the connecting, an auxiliary conductive member is connected to at least one of the first positive electrode tab portion, the second positive electrode tab portion, the first negative electrode tab portion, and the second negative electrode tab portion, and at least one of the first positive electrode tab portion, the second positive electrode tab portion, the first negative electrode tab portion, and the second negative electrode tab portion is electrically connected to the positive electrode collector or the negative electrode collector with the auxiliary conductive member in between.

2. The method for manufacturing a prismatic secondary battery according to claim 1, wherein the positive electrode collector is disposed on the sealing plate with the positive electrode insulating member in between, and wherein the negative electrode collector is disposed on the sealing plate with the negative electrode insulating member in between.

3. The method for manufacturing a prismatic secondary battery according to claim 1, wherein the first electrode body element includes a plurality of the positive electrode plates and a plurality of the negative electrode plates, wherein a plurality of the first positive electrode tab portions are stacked and a plurality of the first negative electrode tab portions are stacked, wherein the second electrode body element includes a plurality of the positive electrode plates and a plurality of the negative electrode plates, and wherein a plurality of the second positive electrode tab portions are stacked and a plurality of the second negative electrode tab portions are stacked.

4. The method for manufacturing a prismatic secondary battery according to claim 1, wherein in the arranging, one side of the first electrode body element and one side of the second electrode body element are brought into contact with each other.

5. The method for manufacturing a prismatic secondary battery according to claim 1, wherein in the arranging, the first positive electrode tab portion, the second positive electrode tab portion, the first negative electrode tab portion, and the second negative electrode tab portion are bent.

6. A method for manufacturing a prismatic secondary battery including an electrode body that includes a positive electrode plate and a negative electrode plate, an outer package that includes an opening and that houses the electrode body, a sealing plate that seals the opening, a positive electrode collector electrically connected to the positive electrode plate, and a negative electrode collector electrically connected to the negative electrode plate, the method comprising:

attaching the positive electrode collector and the negative electrode collector to the sealing plate;

electrically connecting a first positive electrode tab portion and a second positive electrode tab portion to the positive electrode collector and electrically connecting a first negative electric tab portion and a second negative electrode tab portion to the negative electrode collector after disposing, in a short direction of the sealing plate, a first electrode body element including, on a first side of the sealing plate, the positive electrode plate including the first positive electrode tab portion and the negative electrode plate including the first negative electrode tab portion, and a second electrode body element including, on a second side of the sealing plate, the positive electrode plate including the second positive electrode tab portion and the negative electrode plate including the second negative electrode tab portion; and arranging the first electrode body element and the second electrode body element together as one, and the first positive electrode tab portion and the second positive electrode tab portion are connected to a surface of the positive electrode collector which faces the electrode body and the first negative electrode tab portion and the second negative electrode tab portion are connected to a surface of the negative electrode collector which faces the electrode body.

7. The method for manufacturing a prismatic secondary battery according to claim 6, further comprising:

covering the first electrode body element and the second electrode body element, which have been arranged together as one, with an insulating sheet, and subsequently inserting the first electrode body element and the second electrode body element covered with the insulating sheet into the outer package; and an inner side insulating member disposed between the sealing plate and the negative electrode collector;

wherein an edge of the insulating sheet adjacent to the sealing plate is closer to the sealing plate than a surface of the inner side insulating member facing the first electrode body element and the second electrode body element.

8. The method for manufacturing a prismatic secondary battery according to claim 6, further comprising:

covering the first electrode body element and the second electrode body element, which have been arranged together as one, with an insulating sheet, and subsequently inserting the first electrode body element and the second electrode body element covered with the insulating sheet into the outer package; and an inner side insulating member is disposed between the sealing plate and the negative electrode collector;

the outer package includes a bottom, a pair of large-area side walls, and a pair of small-area side walls;

the insulating sheet is interposed between one of the pair of large-area side walls and the inner side insulating member, and between the other one of the pair of large-area side walls and the inner side insulating member.

9. The method for manufacturing a prismatic secondary battery according to claim 6, wherein:

a distal end of the first positive electrode tab portion and a distal end of the second positive electrode tab portion are spaced apart from each other in the short direction of the sealing plate;

a distal end of the first negative electrode tab portion and a distal end of the second negative electrode tab portion are spaced apart from each other in the short direction of the sealing plate.

\* \* \* \* \*